United States Patent
Franza et al.

(10) Patent No.: US 8,031,046 B2
(45) Date of Patent: Oct. 4, 2011

(54) FINGER SENSING DEVICE WITH LOW POWER FINGER DETECTION AND ASSOCIATED METHODS

(75) Inventors: Gordon Scot Franza, Rockledge, FL (US); Gregory Thomas Minteer, Indian Harbour Beach, FL (US)

(73) Assignee: Authentec, Inc., Melbourne, FL (US)

( * ) Notice: Subject to any disclaimer, the term of this patent is extended or adjusted under 35 U.S.C. 154(b) by 1095 days.

(21) Appl. No.: 11/832,054

(22) Filed: Aug. 1, 2007

(65) Prior Publication Data

US 2008/0030302 A1    Feb. 7, 2008

Related U.S. Application Data

(60) Provisional application No. 60/821,158, filed on Aug. 2, 2006.

(51) Int. Cl.
*G08B 21/00* (2006.01)
(52) U.S. Cl. ............. 340/5.53; 340/5.52; 340/5.82; 340/5.83; 382/115; 382/124
(58) Field of Classification Search .......... 340/5.52, 340/5.53, 5.82, 5.83; 382/115, 124–127; 327/94–96
See application file for complete search history.

(56) References Cited

U.S. PATENT DOCUMENTS

| | | | |
|---|---|---|---|
| 5,429,006 A * | 7/1995 | Tamori | 73/862.046 |
| 5,940,526 A | 8/1999 | Setlak et al. | 382/124 |
| 6,628,812 B1 | 9/2003 | Setlak et al. | 382/124 |
| 6,727,800 B1 * | 4/2004 | Dutu | 340/5.53 |
| 6,844,660 B2 | 1/2005 | Scott | 310/334 |
| 7,289,649 B1 * | 10/2007 | Walley et al. | 382/124 |
| 2004/0252867 A1 | 12/2004 | Lan et al. | 382/124 |
| 2005/0063571 A1 * | 3/2005 | Setlak et al. | 382/124 |
| 2005/0089203 A1 | 4/2005 | Setlak | 382/124 |
| 2005/0259850 A1 | 11/2005 | Shimamura et al. | 382/124 |

* cited by examiner

*Primary Examiner* — Toan N Pham
*Assistant Examiner* — Mark Rushing
(74) *Attorney, Agent, or Firm* — Allen, Dyer, Doppelt, Milbrath & Gilchrist, P.A.

(57) ABSTRACT

A finger sensing device may include an array of finger sensing electrodes, and a processor cooperating with the array of finger sensing electrodes for operation in a lower power consumption finger detecting mode, and for operation in a higher power consumption reading mode upon detection of a finger. The processor may selectively bus together finger sensing electrodes into at least one group from the array thereof when in the lower power consumption finger detecting mode to thereby detect a finger adjacent the array of finger sensing electrodes. Accordingly, a finger may be accurately detected and while in a low power mode, such as may be particularly beneficial to extend battery life for portable electronic devices.

34 Claims, 3 Drawing Sheets

FINGER SENSING DEVICE WITH LOW POWER FINGER DETECTION AND ASSOCIATED METHODS

RELATED APPLICATION

This application is based upon provisional patent application 60/821,158, filed Aug. 2, 2006, the entire contents of which are incorporated herein by reference.

FIELD OF THE INVENTION

The present invention relates to the field of personal identification and verification, and, more particularly, to finger sensing and processing.

BACKGROUND OF THE INVENTION

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

In recent years it has been practical and economical to build high-quality electronic fingerprint sensing devices using radio-frequency (RF) electric fields to develop an electronic representation of the fingerprint pattern. One such RF fingerprint sensing device is disclosed in U.S. Pat. No. 5,940,526 to Setlak et al. and assigned to the assignee of the present invention. The patent discloses an integrated circuit fingerprint sensor including an array of RF sensing electrodes to provide an accurate image of the fingerprint friction ridges and valleys. More particularly, the RF sensing permits imaging of live tissue just below the surface of the skin to reduce spoofing, for example. Multiple biometric characteristics sensed from the user's finger may also be used as disclosed in Published U.S. Patent Application No. 2005/0089203 also to Setlak et al., and assigned to the assignee of the present invention. The entire contents of the Setlak et al. patent and published application are incorporated herein by reference.

One important feature of a fingerprint sensor is the ability to detect a finger from a low power state. Typically a user may require the sensor to be in a low power state while no finger is positioned on the sensor. This relaxes the burden on the power supply that may be especially important for portable handheld devices, such as cellular phones, PDA's, etc.

U.S. Pat. No. 6,844,660 to Scott discloses a finger sensor comprising an array of piezoelectric pixels, and that wakeups the circuitry upon detecting a finger pressing upon the array. AuthenTec Inc. of Melbourne, Fla., the assignee of the present invention, has used two finger detection approaches: a first using a hardware delay, and a second based upon image detection. The hardware delay approach includes a calibrated internal resistor-capacitor (RC) delay path as a comparison to a fixed internal resistance in conjunction with the finger capacitance. The sensor wakes up once the finger comes into contact with the electrode ring based upon the internal finger detect comparator changing state. This approach maybe sufficient for static placement sensors, but has some shortcomings for smaller swipe or slide finger sensors where perspiration can accumulate and remain on the sensor. This may cause image data to continue to run and which may eventually end the communication interface. This hardware approach may be unsatisfactory because perspiration accumulation may cause enough delay, or capacitance, to erroneously trip the finger detect comparator.

In the image-based finger detect approach, image data is collected and can be compared after an analog-to-digital (A/D) conversion. This approach addresses the undesired effects of perspiration accumulation, but at the expense of greater power consumption. Further aspects of exemplary finger sensors and wake-up or finger detect circuitry and operation are disclosed in U.S. Pat. Nos. 5,940,526 and 6,628,812, both assigned to the assignee of the present invention and the entire contents of which are incorporated herein by reference.

SUMMARY OF THE INVENTION

In view of the foregoing background, it is therefore an object of the present invention to provide a finger sensing device and associated method for accurate finger detection, and while reducing power consumption.

This and other objects, features and advantages in accordance with the present invention are provided by a finger sensing device comprising an array of finger sensing electrodes, and a processor cooperating with the array of finger sensing electrodes for operation in a lower power consumption finger detecting mode, and for operation in a higher power consumption reading mode upon detection of a finger. Moreover, the processor may selectively bus together finger sensing electrodes into at least one group from the array thereof when in the lower power consumption finger detecting mode to thereby detect a finger adjacent the array of finger sensing electrodes. Accordingly, a finger may be accurately detected and while in a low power mode, such as may be particularly beneficial to extend the battery life for portable electronic devices.

The processor may further include a plurality of electrode sense circuits, and a first plurality of switches for selectively connecting each finger sense circuit to a respective finger sensing electrode when in the higher power consumption reading mode. In some embodiments the at least one group of finger sensing electrodes may comprise a plurality thereof. In these embodiments, the processor may further comprise a plurality of bussed electrode amplifiers, and a second plurality of switches for selectively connecting each bussed electrode amplifier to a respective group of finger sensing electrodes when in the lower power consumption finger detecting mode.

The processor may further comprise a sample-and-hold circuit connected to the plurality of bussed electrode amplifiers for generating a sampled finger detect signal. The processor may also include a comparator connected to the sample-and-hold circuit for comparing the sampled finger detect signal to a threshold.

The array of finger sensing electrodes may be arranged in rows and columns. Accordingly, the at least one group of finger sensing electrodes may include a plurality thereof so that each group of finger sensing electrodes comprises a respective row of finger sensing electrodes.

The finger sensing device may further include a finger drive electrode spaced from the array of finger sensing electrodes and coupled to the processor. In addition, the processor may perform at least one of a finger matching function, and a navigation function in the higher power consumption reading mode. For example, the processor when in the higher power consumption reading mode may read a finger based upon static finger placement in some embodiments, and may read a finger based upon sliding finger placement in yet other embodiments.

The finger sensing device may also include a semiconductor substrate carrying the array of finger sensing electrodes, and on which at least portions of the processor are integrated. In addition, the array of finger sensing electrodes and the processor may consume less than 100 microamps when in the lower power consumption finger detecting mode, for example. Also, the processor may operate the at least one group of finger sensing electrodes to have an on time duty cycle of less than 1.5% when in the lower power consumption finger detecting mode.

The array of finger sensing electrodes may comprise an array of radio frequency (RF) sensing electrodes, for example. Alternatively, the array of finger sensing electrodes may comprise an array of capacitive finger sensing electrodes.

Another aspect relates to an electronic device including a housing and a display carried by the housing. The finger sensing device may also be carried by the housing. For example, the electronic device may comprise a cellular telephone, a PDA, a laptop computer, etc.

A method aspect is directed to detecting a finger adjacent a finger sensing device comprising an array of finger sensing electrodes and operating in a lower power consumption finger detecting mode, and operating in a higher power consumption reading mode upon detection of the finger. The method may include selectively bussing together finger sensing electrodes into at least one group from the array thereof when in the lower power consumption finger detecting mode to thereby detect a finger adjacent the array of finger sensing electrodes.

DETAILED DESCRIPTION OF THE PREFERRED EMBODIMENTS

The present invention will now be described more fully hereinafter with reference to the accompanying drawing, in which preferred embodiments of the invention are shown. This invention may, however, be embodied in many different forms and should not be construed as limited to the embodiments set forth herein. Rather, the embodiments are provided so that this disclosure will be thorough and complete, and will fully convey the scope of the invention to those skilled in the art. Like numbers refer to like elements throughout.

Figure 1:
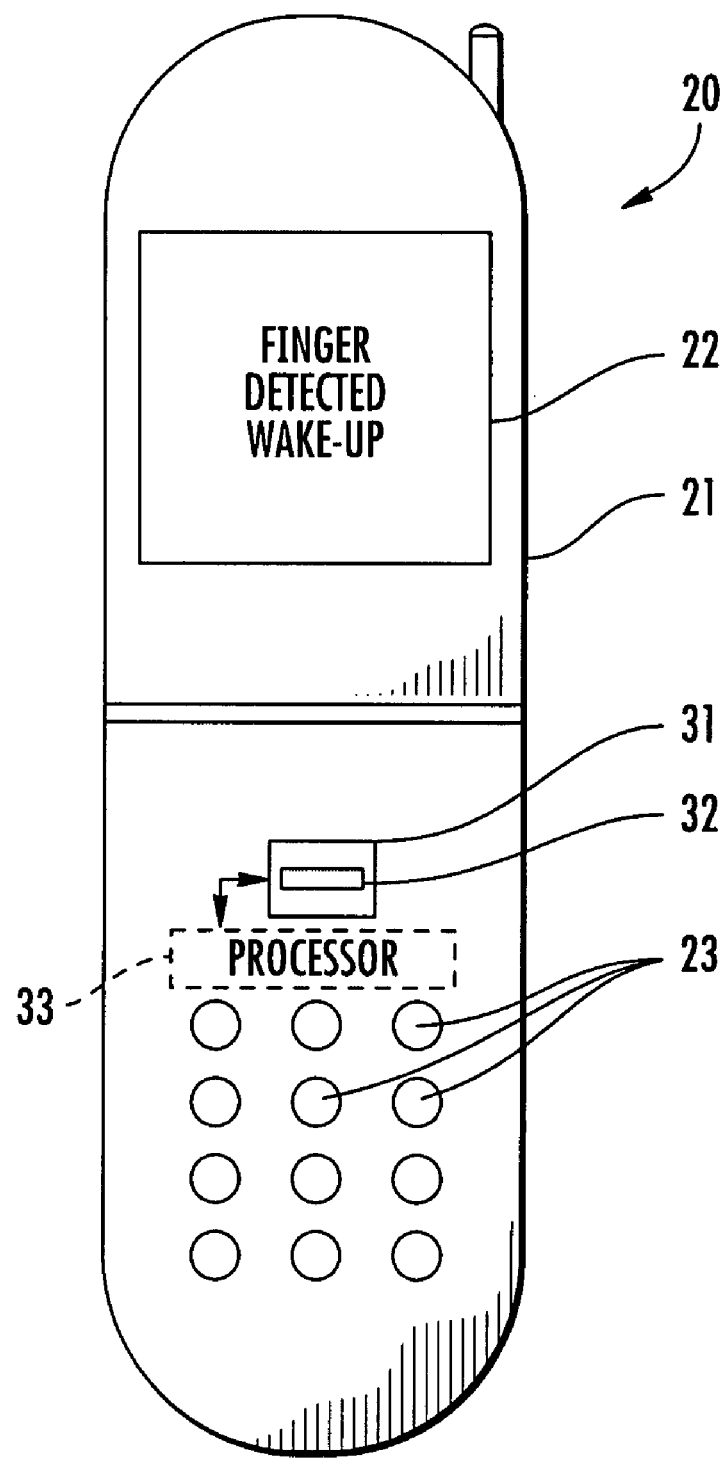
FIG. 1 is schematic front elevation view of an electronic device in the form of a cellular telephone and including a finger sensing device in accordance with the present invention.
Figure 2:
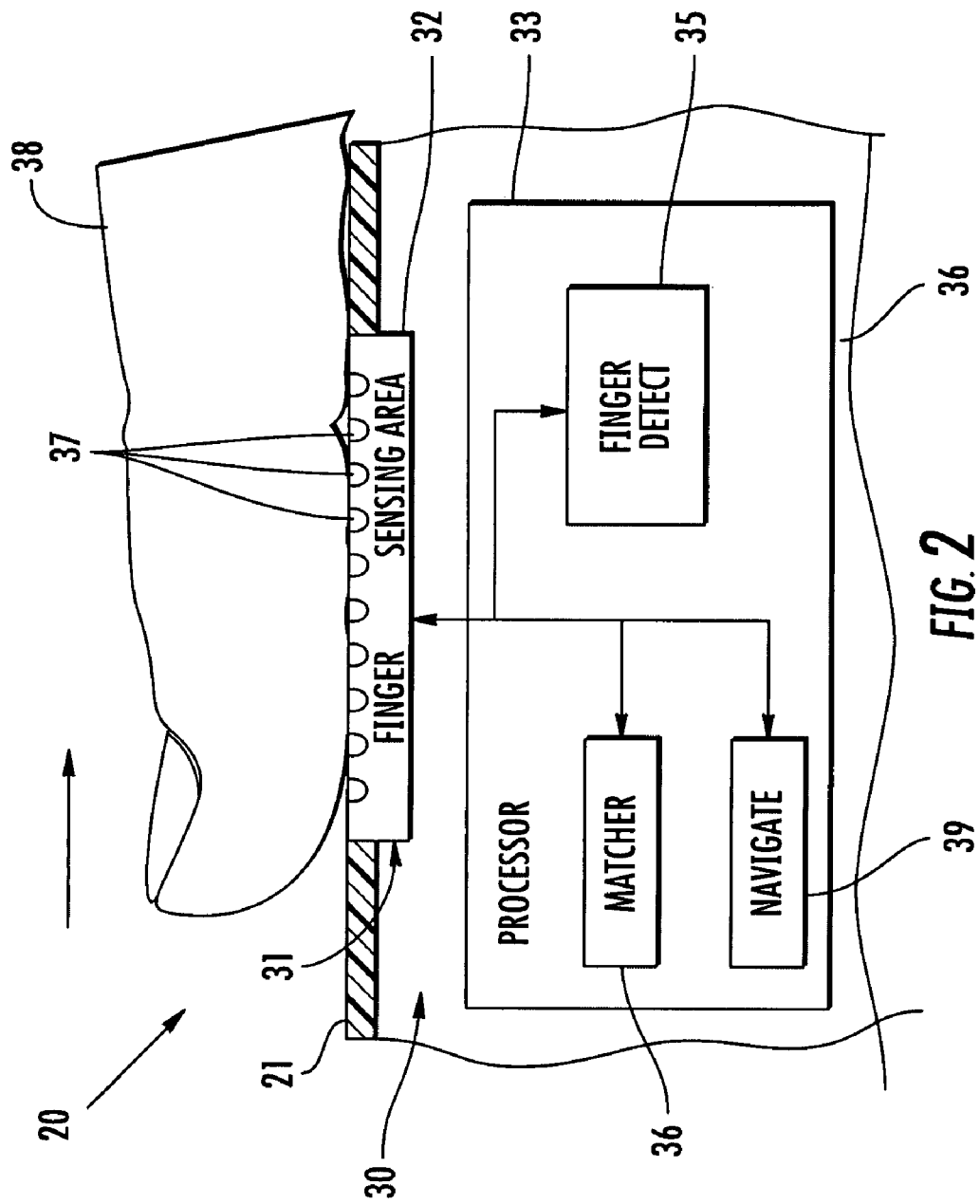
FIG. 2 is a schematic block diagram of a portion of the cellular telephone as shown in FIG. 1.

Referring initially to FIGS. 1 and 2 an electronic device in the form of a cellular telephone 20 includes the finger sensing device 30 according to the invention. The cellular telephone 20 is but one example of an electronic device that may benefit from the finger sensing device 30 as will be appreciated by those skilled in the art. The illustrated cellular telephone 20 includes a portable housing 21 that carries a display 22 and a keyboard 23. An integrated circuit finger sensor 31 is carried by the housing 21 and includes a finger sensing area 32 to receive a user's finger 38 (FIG. 2) moved in a sliding motion. The finger sensing area 32 may typically sense the image of ridges and valleys of a fingerprint, or may image other features of the user's finger, such as pores, or even subdermal features, as will be appreciated by those skilled in the art. In other embodiments the finger sensing area 32 could be based upon static finger placement as will be appreciated by those skilled in the art.

The finger sensor 31 illustratively includes a processor 33 cooperating with the finger sensing area 32 for collecting image data therefrom. In some embodiments, the processor 33 may be provided by processing or control circuitry included on the integrated circuit substrate with the finger sensing area 32, and a host processor (not shown) as typically carried by the housing 21. Such a host processor for the cellular telephone 20 may typically perform the traditional processing for telephone functions, and may also have additional processing capability available for finger matching, finger navigation, etc. as will be appreciated by those skilled in the art. In other embodiments, the processor 33 may be implemented totally along with the finger sensing area 32 or in a separate integrated circuit as will also be appreciated by those skilled in the art.

The finger sensing area 32 illustratively includes an array of finger sensing electrodes 37, such as electric field sensing electrodes formed on an integrated circuit substrate of the type as described in U.S. Pat. No. 5,963,679 to Setlak et al., assigned to the assignee of the present invention, and the entire contents of which are incorporated herein by reference. These sensing electrodes 37 for radio frequency (RF) or e-field sensing are typically in the form of a center electrode surrounded by a shield electrode for each sensing pixel as explained in greater detail in the Setlak et al. '679 patent. The array of finger sensing electrodes 37 may comprise an array of capacitive sensing electrodes in other embodiments and as will be appreciated by those skilled in the art.

The processor 33 cooperates with the array of finger sensing electrodes 37 for operation in a lower power consumption finger detecting mode, and for operation in a higher power consumption reading mode upon detection of a finger. Accordingly, the processor 33 may include the finger detector circuitry 35 cooperating with the array of finger sensing electrodes 37, as will be described in greater detail below. The processor 33 also illustratively includes a matcher 36 providing a finger matching function, and also typically participating in an enroll function as will be appreciated by those skilled in the art. The processor 33 may also include a navigation block 39 to provide one or more display navigation functions as will also be appreciated by those skilled in the art. The matching and/or navigation functions may result in higher power consumption.

The processor 33 may selectively bus together finger sensing electrodes 37 into at least one group from the array thereof when in the lower power consumption finger detecting mode to thereby detect a finger 38 adjacent the array of finger sensing electrodes. A finger 38 may be accurately detected and while in a low power mode, as particularly beneficial to extend battery life for the cellphone 20 or other similar portable electronic devices.

Figure 3:
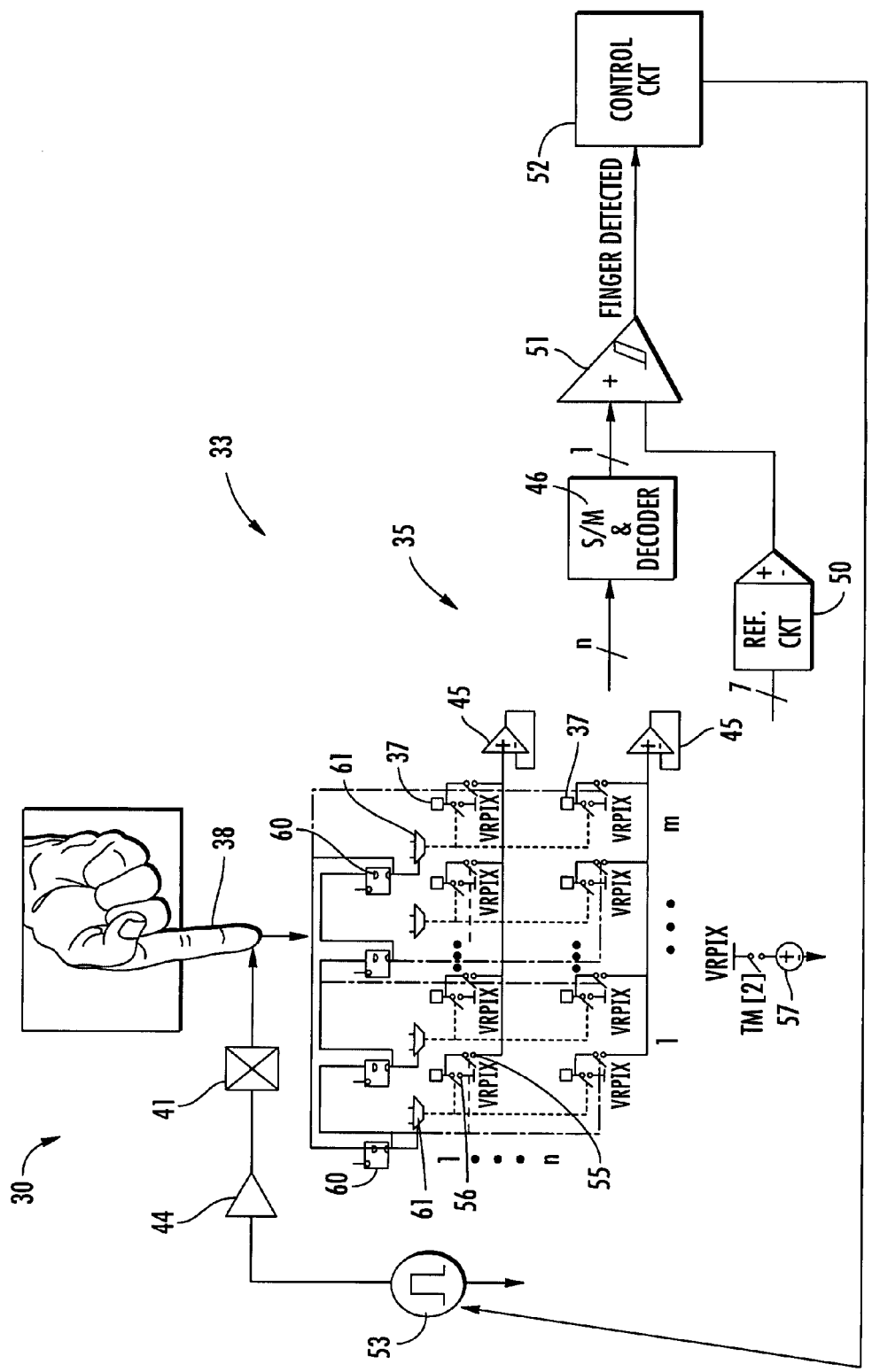
FIG. 3 is a schematic circuit diagram of the finger sensing device as shown in FIGS. 1 and 2.

Turning now additionally to the more detailed schematic diagram of FIG. 3, the finger sensing device 30 illustratively includes a finger drive electrode 41 that may be carried externally of the sensor package, for example. The array of sensing electrodes 37 may be arranged in N rows and M columns as will be appreciated by those skilled in the art. Upon contact of the user's finger 38 with the drive electrode 41 and array of sensing electrodes 37, the low power finger detect circuitry or detector 35 will detect the finger and start another task, such as a full reading of the user's finger as the user's finger is moved in a sliding motion, and/or a navigation related task as will be appreciated by those skilled in the art.

Each of the N rows of sensing electrodes 37 has an amplifier associated therewith defining a bussed electrode amplifier 45 which is typically maintained on. A sample and hold and decoder circuit 46 is connected to the bussed electrode amplifiers 45. The sample and hold and decoder circuit 46 may output an average power from the bussed group of electrodes 37 that is compared in comparator 51 with a reference or threshold level set by the reference setting circuit 50. The finger detect signal from the comparator 51 is, in turn, coupled to the control circuit 52 which may be operating at the system clock frequency, such as 1.25 kHz, for example. The output of the control circuit 52 is illustratively fed to a squarewave generator 53. The output of the squarewave generator 53, in turn, is illustratively fed to the external finger drive electrode 41 via the illustrated buffer 44. For example, nine clock pulses may allow collection of the finger detect signals.

A first plurality of switches 56 is for selectively connecting each finger sense or source circuit 57 to a respective finger sensing electrode 37 when in the higher power consumption reading mode. A second plurality of switches 55 is used to selectively connect the finger sensing electrodes 37 to the bussed electrode amplifiers 45. Flip-flops 60 and multiplexers 61 are also coupled to the finger sensing electrodes 37 to enable selection of bussed pixel finger detection or normal finger reading as will be appreciated by those skilled in the art.

Those of skill in the art will recognize that the low power finger detect circuitry and approach may be used in static placement or swipe finger sensors. A given contiguous group of finger sensing electrodes 37 could be bussed, and/or spaced apart electrodes could be bussed together for the finger detection. In addition, although the embodiment described above is directed to electric field or RF field finger sensing, capacitive and other types of finger sensors may also use the low power finger detection. Such sensors are becoming more widely used in portable electronic devices, such as laptops, PDA's and cellphones, that typically include a rechargeable battery within the device housing.

The finger detection approach described herein transmits a signal into a finger 38 and receives the finger energy on a bussed together finger electrode or antenna array. The bussed antenna array may distribute the average incoming energy evenly across the array to open the detection capture area to the entire array. In other words, a person can place his finger anywhere on the array 37 and the processor 33 can look in the same location to measure the average energy. The amplitude of the signal may be captured by the sample-and-hold circuit 46. The level may be compared against a reference level to determine if the finger is present. This architecture consumes very little power because the simplified analog circuitry, as well as the digital control create very low duty cycle ratios to drive the average power well into the micro-ampere region. For example, a current draw may be about 100 microamps or less for a portable handheld device, such as a cellphone or PDA, for example. The period may be 2 milliseconds with an on time of 30 microseconds producing about a 1.5% duty cycle, and with a peak current of about 6 milliamps.

A method aspect is directed to detecting a finger 38 adjacent a finger sensing device 30 comprising an array of finger sensing electrodes 37 and operating in a lower power consumption finger detecting mode, and operating in a higher power consumption reading mode upon detection of the finger. The method may include selectively bussing together finger sensing electrodes 37 into at least one group from the array thereof when in the lower power consumption finger detecting mode to thereby detect a finger 38 adjacent the array of finger sensing electrodes.

Many modifications and other embodiments of the invention will come to the mind of one skilled in the art having the benefit of the teachings presented in the foregoing descriptions and the associated drawing. Therefore, it is understood that the invention is not to be limited to the specific embodiments disclosed, and that other modifications and embodiments are intended to be included.

That which is claimed is:

1. A finger sensing device comprising:
   an array of finger sensing electrodes; and
   a processor cooperating with said array of finger sensing electrodes for operation in a lower power consumption finger detecting mode, and for operation in a higher power consumption reading mode upon detection of a finger;
   said processor selectively bussing together finger sensing electrodes into at least one group from said array thereof when in the lower power consumption finger detecting mode to thereby detect a finger adjacent said array of finger sensing electrodes.

2. The finger sensing device according to claim 1 wherein said processor further comprises:
   a plurality of electrode sense circuits; and
   a first plurality of switches for selectively connecting each finger sense circuit to a respective finger sensing electrode when in the higher power consumption reading mode.

3. The finger sensing device according to claim 2 wherein said at least one group of finger sensing electrodes comprises a plurality thereof; and wherein said processor further comprises:
   a plurality of bussed electrode amplifiers; and
   a second plurality of switches for selectively connecting each bussed electrode amplifier to a respective group of finger sensing electrodes when in the lower power consumption finger detecting mode.

4. The finger sensing device according to claim 3 wherein said processor further comprises:
   a sample-and-hold circuit connected to said plurality of bussed electrode amplifiers for generating a sampled finger detect signal; and
   a comparator connected to said sample-and-hold circuit for comparing the sampled finger detect signal to a threshold.

5. The finger sensing device according to claim 1 wherein said array of finger sensing electrodes are arranged in rows and columns; wherein said at least one group of finger sensing electrodes comprises a plurality thereof; and wherein each group of finger sensing electrodes comprises a respective row of finger sensing electrodes.

6. The finger sensing device according to claim 1 further comprising a finger drive electrode spaced from said array of finger sensing electrodes and coupled to said processor.

7. The finger sensing device according to claim 1 wherein said processor further performs at least one of a finger matching function and a navigation function in the higher power consumption reading mode.

8. The finger sensing device according to claim 1 wherein said processor when in the higher power consumption reading mode reads a finger based upon static finger placement.

9. The finger sensing device according to claim 1 wherein said processor when in the higher power consumption reading mode reads a finger based upon sliding finger placement.

10. The finger sensing device according to claim 1 further comprising a semiconductor substrate carrying said array of finger sensing electrodes, and on which at least portions of said processor are integrated.

11. The finger sensing device according to claim 1 wherein said array of finger sensing electrodes and said processor consume less than 100 microamps when in the lower power consumption finger detecting mode.

12. The finger sensing device according to claim 1 wherein said processor operates said at least one group of finger sensing electrodes to have an on time duty cycle of less than 1.5% when in the lower power consumption finger detecting mode.

13. The finger sensing device according to claim 1 wherein said array of finger sensing electrodes comprises an array of radio frequency (RF) sensing electrodes.

14. The finger sensing device according to claim 1 wherein said array of finger sensing electrodes comprises an array of capacitive sensing electrodes.

15. A finger sensing device comprising:
a semiconductor substrate;
an array of finger sensing electrodes carried by said semiconductor substrate; and
a processor cooperating with said array of finger sensing electrodes for operation in a lower power consumption finger detecting mode, and for operation in a higher power consumption reading mode upon detection of a finger;
said processor selectively bussing together finger sensing electrodes into a plurality of groups from said array thereof when in the lower power consumption finger detecting mode to thereby detect a finger adjacent said array of finger sensing electrodes;
said processor further performing at least one of a finger matching function and a navigation function in the higher power consumption reading mode.

16. The finger sensing device according to claim 15 wherein said processor further comprises:
a plurality of electrode sense circuits;
a first plurality of switches for selectively connecting each finger sense circuit to a respective finger sensing electrode when in the higher power consumption reading mode;
a plurality of bussed electrode amplifiers; and
a second plurality of switches for selectively connecting each bussed electrode amplifier to a respective group of finger sensing electrodes when in the lower power consumption finger detecting mode.

17. The finger sensing device according to claim 16 wherein said processor further comprises:
a sample-and-hold circuit connected to said plurality of bussed electrode amplifiers for generating a sampled finger detect signal; and
a comparator connected to said sample-and-hold circuit for comparing the sampled finger detect signal to a threshold.

18. The finger sensing device according to claim 15 further comprising a finger drive electrode spaced from said array of finger sensing electrodes and coupled to said processor.

19. The finger sensing device according to claim 15 wherein said array of finger sensing electrodes comprises an array of radio frequency (RF) sensing electrodes.

20. The finger sensing device according to claim 15 wherein said array of finger sensing electrodes comprises an array of capacitive sensing electrodes.

21. An electronic device comprising:
a housing;
a display carried by said housing;
an array of finger sensing electrodes carried by said housing; and
a processor cooperating with said array of finger sensing electrodes for operation in a lower power consumption finger detecting mode, and for operation in a higher power consumption reading mode upon detection of a finger;
said processor selectively bussing together finger sensing electrodes into at least one group from said array thereof when in the lower power consumption finger detecting mode to thereby detect a finger adjacent said array of finger sensing electrodes.

22. The electronic device according to claim 21 wherein said processor further comprises:
a plurality of electrode sense circuits; and
a first plurality of switches for selectively connecting each finger sense circuit to a respective finger sensing electrode when in the higher power consumption reading mode.

23. The electronic device according to claim 22 wherein said at least one group of finger sensing electrodes comprises a plurality thereof; and wherein said processor further comprises:
a plurality of bussed electrode amplifiers; and
a second plurality of switches for selectively connecting each bussed electrode amplifier to a respective group of finger sensing electrodes when in the lower power consumption finger detecting mode.

24. The electronic device according to claim 23 wherein said processor further comprises:
a sample-and-hold circuit connected to said plurality of bussed electrode amplifiers for generating a sampled finger detect signal; and
a comparator connected to said sample-and-hold circuit for comparing the sampled finger detect signal to a threshold.

25. The electronic device according to claim 21 further comprising a finger drive electrode spaced from said array of finger sensing electrodes and coupled to said processor.

26. The electronic device according to claim 21 wherein said processor further performs at least one of a finger matching function and a navigation function in the higher power consumption reading mode.

27. The electronic device according to claim 21 further comprising a semiconductor substrate carrying said array of finger sensing electrodes, and on which at least portions of said processor are integrated.

28. A method for detecting a finger adjacent a finger sensing device comprising an array of finger sensing electrodes and operating in a lower power consumption finger detecting mode, and operating in a higher power consumption reading mode upon detection of the finger, the method comprising:
selectively bussing together finger sensing electrodes into at least one group from the array thereof when in the lower power consumption finger detecting mode to thereby detect a finger adjacent the array of finger sensing electrodes.

29. The method according to claim 28 wherein the finger sensing device further comprises a plurality of electrode sense circuits; and further comprising selectively connecting each finger sense circuit to a respective finger sensing electrode when in the higher power consumption reading mode.

30. The method according to claim 29 wherein the at least one group of finger sensing electrodes comprises a plurality thereof; and wherein the finger sensing device further comprises a plurality of bussed electrode amplifiers; and further comprising selectively connecting each bussed electrode amplifier to a respective group of finger sensing electrodes when in the lower power consumption finger detecting mode.

31. The method according to claim 30 wherein the finger sensing device further comprises a sample-and-hold circuit connected to the plurality of bussed electrode amplifiers for generating a sampled finger detect signal; and further comprising comparing the sampled finger detect signal to a threshold.

32. The method according to claim 28 wherein the finger sensing device further comprises a finger drive electrode spaced from the array of finger sensing electrodes.

33. The method according to claim 28 further comprising performing at least one of a finger matching function and a navigation function in the higher power consumption reading mode.

34. The method according to claim 28 wherein the finger sensing device further comprises a semiconductor substrate carrying the array of finger sensing electrodes.

* * * * *